Oct. 28, 1947.　　　E. A. GLYNN　　　2,429,715
TIRE MOLD BODY
Filed Jan. 26, 1944　　　3 Sheets-Sheet 1
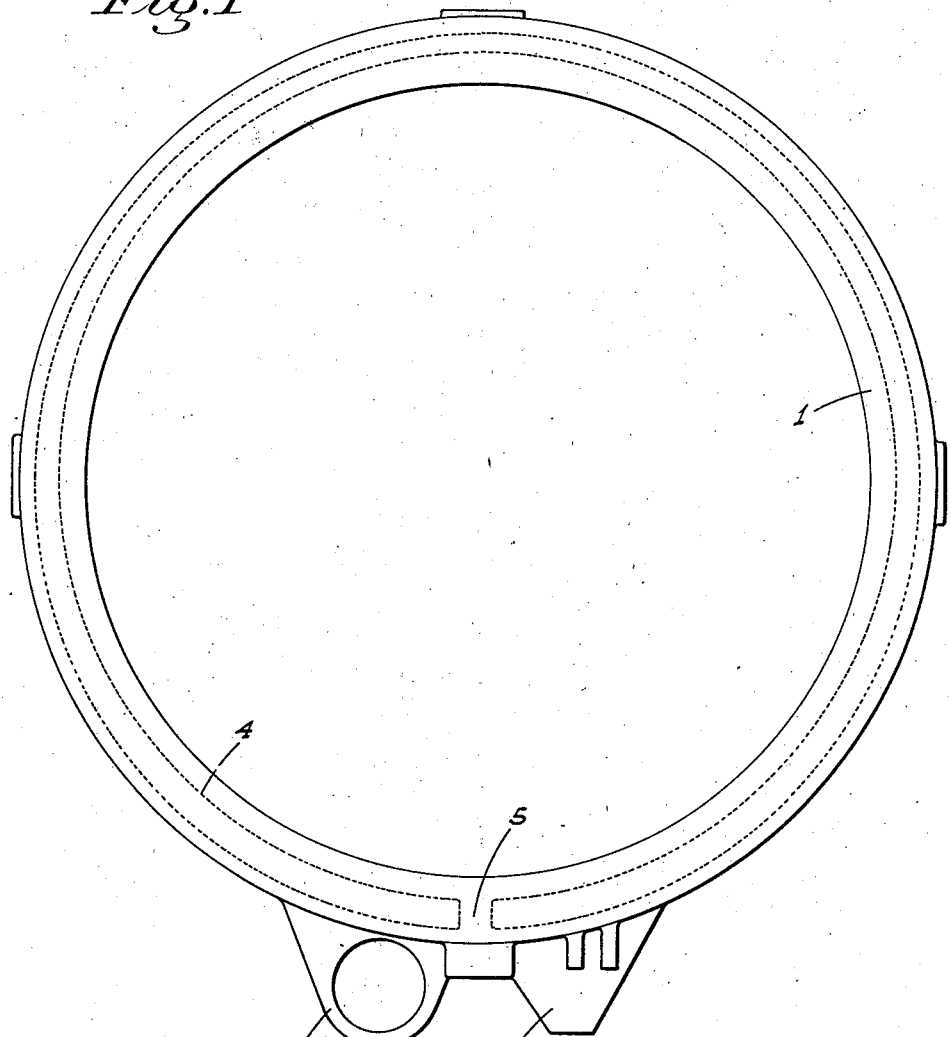
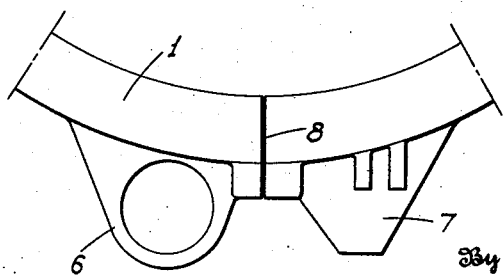
Inventor
E.A.Glynn Oct. 28, 1947.     E. A. GLYNN     2,429,715
TIRE MOLD BODY
Filed Jan. 26, 1944     3 Sheets-Sheet 2

Inventor
E. A. Glynn
By
Attorneys

Oct. 28, 1947.   E. A. GLYNN   2,429,715
TIRE MOLD BODY
Filed Jan. 26, 1944   3 Sheets-Sheet 3

Inventor
E. A. Glynn

Patented Oct. 28, 1947

2,429,715

UNITED STATES PATENT OFFICE 2,429,715

TIRE MOLD BODY

Edwin A. Glynn, Lodi, Calif., assignor to Super Mold Corporation of California, Lodi, Calif., a corporation of California Application January 26, 1944, Serial No. 519,749

1 Claim. (Cl. 18—18)

This invention relates in general to, and it is an object to provide, an improved mold body for a tread vulcanizing mold of the character shown in copending U. S. patent application, Serial No. 478,502, filed March 9, 1943, now Patent No. 2,370,655, such mold body being of full circle configuration, split through transversely at one point only in its circumference, and resilient in a radial plane whereby to permit of mechanically controlled expansion and contraction of said resilient body to accomplish locking or release, respectively, of the tire side wall engaging and retaining rings which the mold includes.

When the body is contracted to ring retaining and working position, the ends of the body at the transverse split are engaged, and when the body is expanded to release the rings, there is a gap between said ends of substantial length or circumferential extent.

The present improvement in said mold body comprises forming the resilient body so that when the same is unloaded (i. e., when no expanding or contracting force is applied thereto), there is a gap between the ends of said body of a length comprising only a portion of the total length of said gap when the body is expanded to release the rings; said portion preferably being approximately one-half of said total length.

The advantage of the above feature resides in the fact that a substantially equal force is needed to close the gap to working position of the body and to open the gap to ring release position of the body. As such opening and closing of the split body is a manually actuated mechanical operation, the energy required to open or close the body is materially lessened relative to that which would be needed if the body, when unloaded, were either fully open or closed.

Another advantage of this invention is that the strain on the metal of the resilient body when open or closed from the "normalized" position is not great, minimizing the possibility of metal failure in the body.

A further object of this invention is to provide a novel method of manufacture of the above mold body.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a plan view of the mold body, as cast.

Figure 2 is a fragmentary plan view of the body showing said cast body as split transversely at one point, but before treating of said body to form the desired gap.

Figure 3:
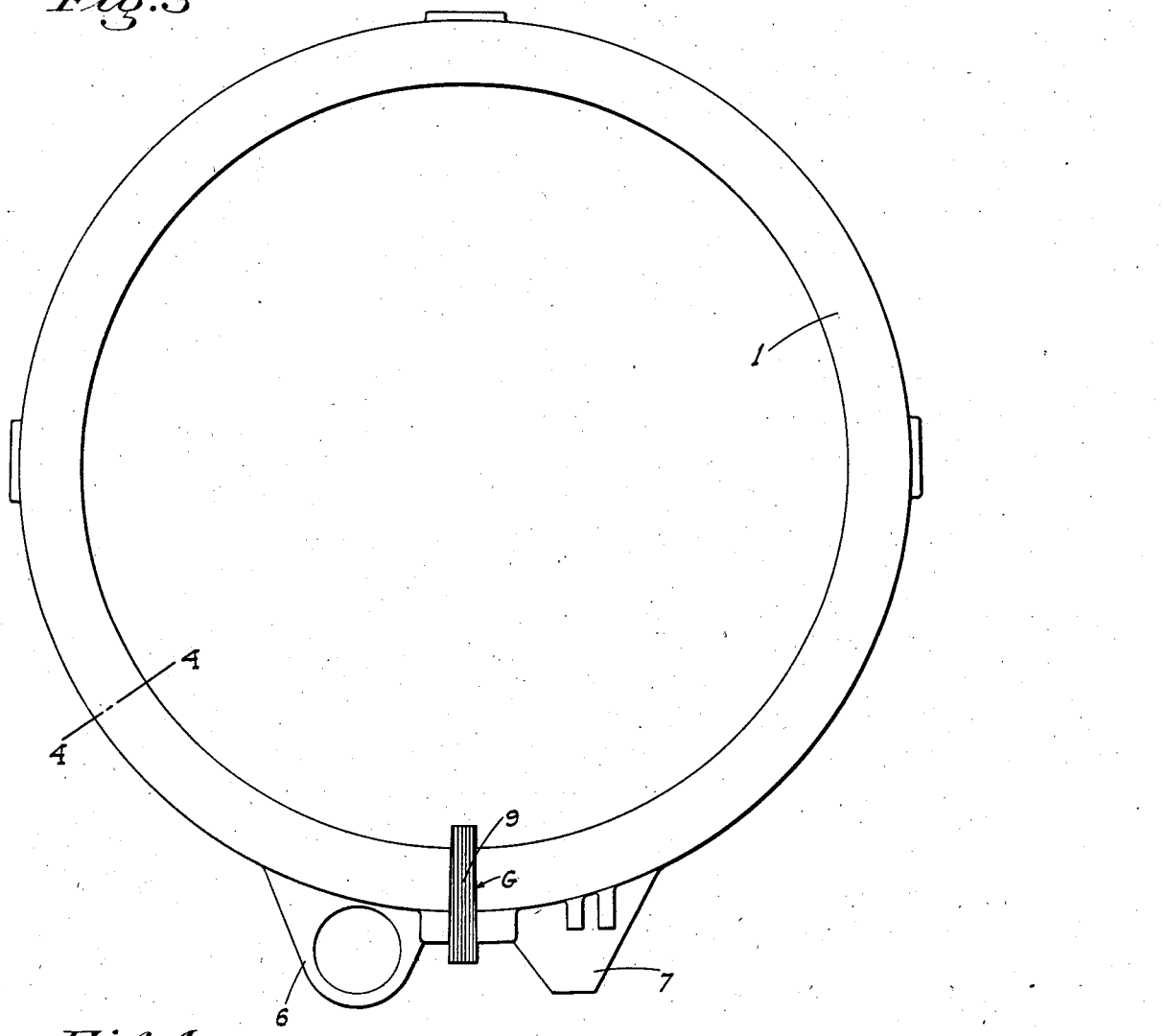
Figure 3 is a plan view of the body as blocked open at the gap preparatory to heat treating said body.
Figure 4:
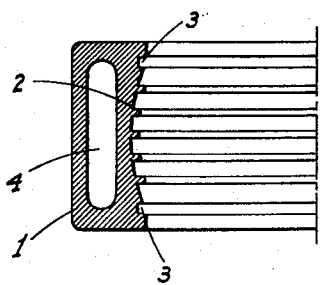
Figure 4 is a cross section on line 4—4 of Fig. 3.

Referring now more particularly to the characters of reference on the drawings, the body 1 is of full circle configuration and is initially cast of resilient metal in unbroken or continuous form, as shown in Fig. 1; said body including on its inner wall a machined tread forming matrix 2 and on opposite sides of said matrix includes machined locking grooves 3 with which the tire side wall engaging and retaining rings (not shown) are adapted to cooperate. The body also includes an internal steam chamber 4 which extends about the entire body except for a web 5 of limited circumferential extent which intersects said chamber radially at one point in its length.

Vertically spaced pairs of ears 6 and 7 are formed integral with and project outwardly from body 1 on opposite sides of the web 5; such pairs of ears being adapted for connection with the expansion and contraction control mechanism, hereinafter described generally as shown and described in detail in copending application, Serial No. 478,502.

After the body 1 is cast in continuous form, as in Fig. 1, it is machined as necessary, then cut through or split radially, as by sawing with a fine gauge saw, at the web 5, as shown at 8 in Fig. 2. Thereafter a heat resistant spacing block 9 is inserted between the ends of said body at the split, widening the latter to a gap of predetermined length and which is preferably approximately one-half the length of the gap when the body is in full open or ring-release position.

Figure 5:
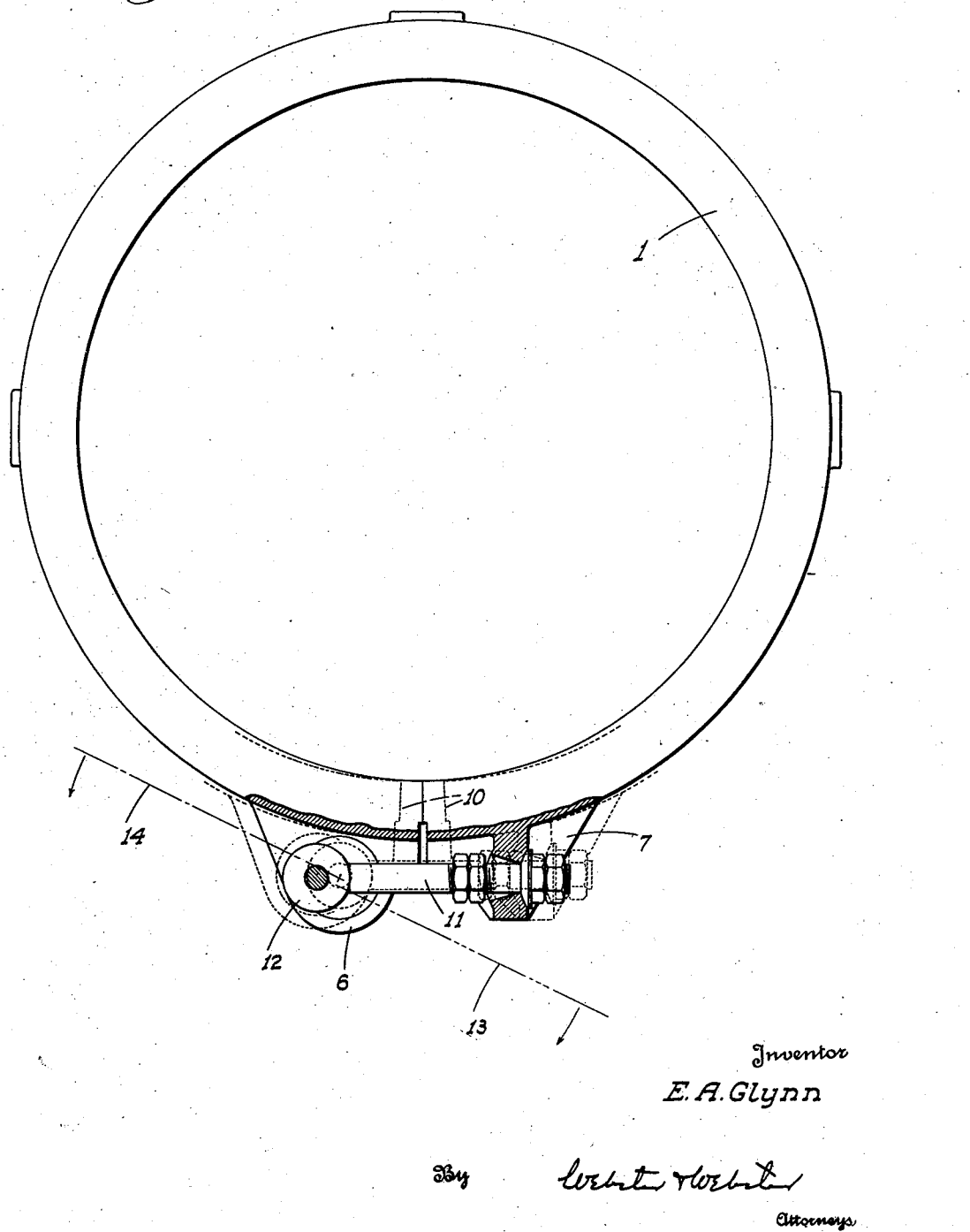
Figure 5 is a plan view of the body as completed, the body being shown in closed position in full lines, and in fully open position in dotted lines.

With the block 9 in place, the body 1 is heat treated for a predetermined length of time and then permitted to cool; the heat treating being such as to "normalize" the body with the gap between adjacent ends thereof produced by the block 9; i. e. when the block 9 is thereafter removed, the gap G remains unchanged in length. For example, if the total gap length is 1½" when the body 1 is in full open position, as shown at 10 in dotted lines in Fig. 5, such body is blocked open and heat treated so that the gap G is approximately ¾" in length when said body is unloaded.

After the body has been heat treated and the block 9 removed, the pairs of ears 6 and 7 are connected by a control mechanism which includes an expansion and contraction control link 11 which is actuated by a rotary cam 12; the line of the handle being shown in broken lines 13 and 14 which represent, respectively, the positions of the handle when the mold is open and closed.

By reason of the described construction of the cast body 1, including particularly the gap G when the body is unloaded, the resistance to opening or closing thereof is substantially equalized. As a consequence, the body can be readily opened and closed with reasonable effort on the part of the operator, and without undue strain on the cast metal from which the body is formed.

The matrix, when the body is in closed position, presents the same true circle configuration as when the body was initially machined prior to splitting and heat treating of the same to produce the gap G. Also, the initial machining of the matrix is accomplished readily and with facility as the tool then engages the work on a continuous surface thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a tire tread vulcanizing mold, a full-circle body, said body being split through transversely at one point in its circumference and being resilient in a radial plane, the ends of the body adjacent the split being gapped to a predetermined extent when said resilient body is unloaded whereby to permit expansion and contraction of the body to predetermine open and closed positions, respectively, and means connected with the open ends of the gap and operative to expand or contract the body, respectively, the length of the gap when the resilient body is unloaded being approximately one-half the length of the gap when the body is expanded to such predetermined open position, the expanding and contracting means being in substantially neutral position when the body is unloaded, all whereby to equalize the force required to fully contract and to fully expand the body to the predetermined position, respectively, from its unloaded position.

EDWIN A. GLYNN.

REFERENCES CITED

The following references are of record in the file of this patent:

UNITED STATES PATENTS

| Number | Name | Date |
| --- | --- | --- |
| 2,147,339 | Glynn | Feb. 14, 1939 |
| 2,157,967 | Riccio | May 9, 1939 |
| 2,313,414 | Wheatley | Mar. 9, 1943 |
| 2,224,337 | Bostwick | Dec. 10, 1940 |
| 2,284,000 | Kraft | May 26, 1942 |
| 2,214,650 | Bancroft | Sept. 10, 1940 |
| 2,033,093 | Covert | Mar. 3, 1936 |